Oct. 21, 1924.  
R. HOFFMAN  
COLLAPSIBLE SHUTTER  
Filed March 25, 1922   2 Sheets-Sheet 1
1,512,092
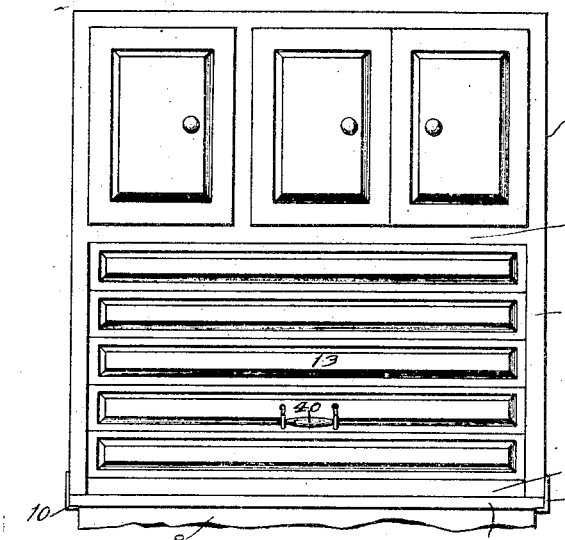
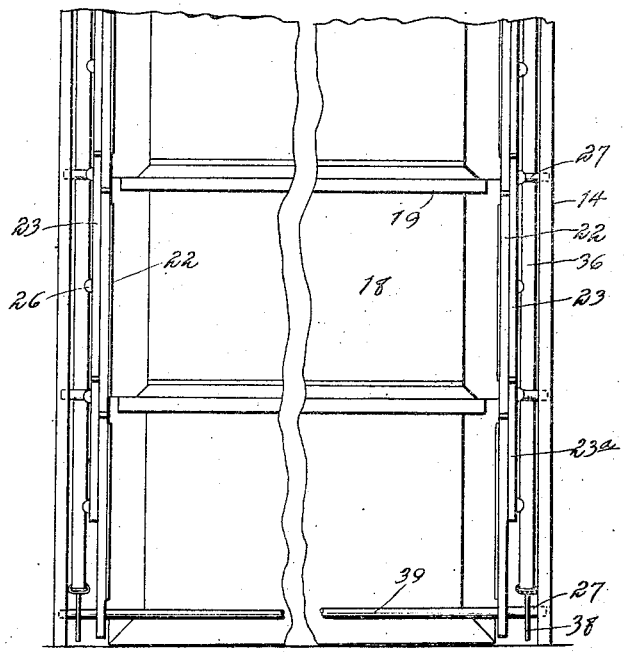
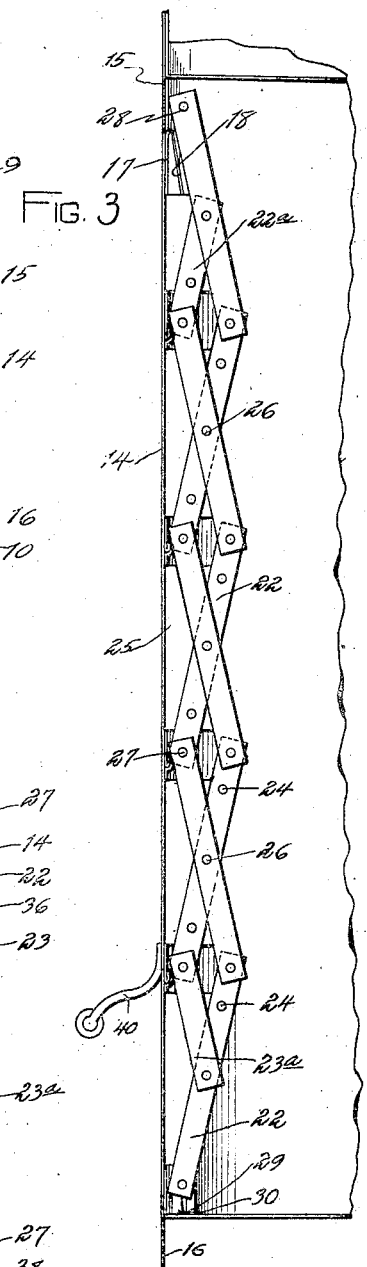
INVENTOR  
RUDOLPH HOFFMAN  
ATTYS Oct. 21, 1924. 1,512,092
R. HOFFMAN
COLLAPSIBLE SHUTTER
Filed March 25, 1922 2 Sheets-Sheet 2

INVENTOR
RUDOLPH HOFFMAN
By Chindahl, Parker & Carlson
ATTYS

Patented Oct. 21, 1924.

1,512,092

UNITED STATES PATENT OFFICE.

RUDOLPH HOFFMAN, OF KANKAKEE, ILLINOIS.

COLLAPSIBLE SHUTTER.

Application filed March 25, 1922. Serial No. 546,556.

*To all whom it may concern:*

Be it known that I, RUDOLPH HOFFMAN, a citizen of the United States, residing at Kankakee, in the county of Kankakee and State of Illinois, have invented a certain new and useful Collapsible Shutter, of which the following is a specification.

The invention relates to shutters of the type comprising a plurality of leaves hinged together for movement from extended relation into a compact stack and vice versa; and it has for its primary object the provision of a shutter capable of rapid and easy manipulation with substantially no noise, occupying a minimum amount of space whether in its open or closed position, and capable of effectively closing the compartments while presenting a neat and ornamental appearance.

A further and important object of the invention is to provide a shutter of the collapsible type having associated therewith means for counterbalancing the leaves of the shutter, capable of maintaining the leaves at various elevations across the opening to be closed, leaving the opening wholly or partially closed, as may be desired.

A further object of the invention is to provide a shutter of the character referred to which is of a very practical construction, durable and capable of a smooth and easy operation.

In the accompanying drawings, I have shown the invention as applied by way of illustration to a kitchen cabinet, but it will be understood that the appended claims are not to be limited in their interpretation to such use of the shutter nor to the precise construction and arrangement illustrated and described except as may be necessitated by the state of the prior art.

Figure 4:
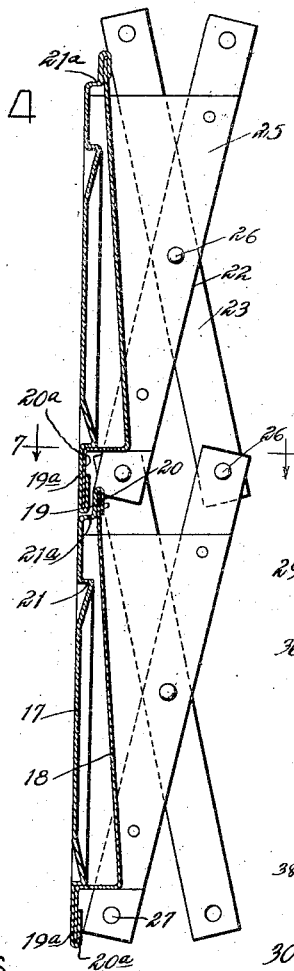
Figure 5:
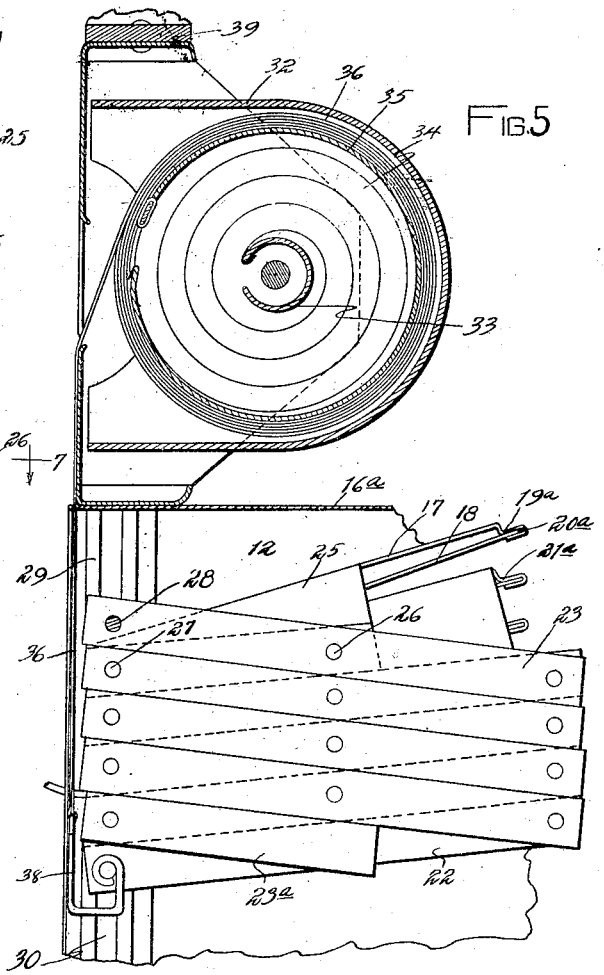
Figure 6:
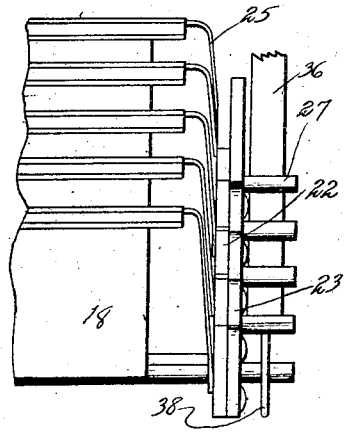
Figure 7:
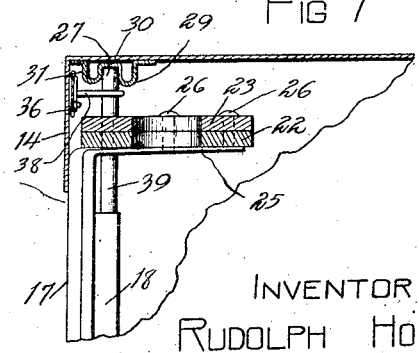

Figure 1 of the drawings is a front elevational view of the upper portion of a kitchen cabinet equipped with my improved shutter and showing the same in closed position. Fig. 2 is a fragmentary elevational view of the rear side of the extended shutter and its guideways. Fig. 3 is a fragmentary vertical sectional view through the upper section of the cabinet, showing the leaf connecting linkage of the shutter extended. Fig. 4 is a vertical sectional view on an enlarged scale through a pair of leaves of the shutter and showing the hinge connections. Fig. 5 is a fragmentary vertical sectional view showing the shutter in its collapsed relation, and its counterbalancing spring means. Fig. 6 is a fragmentary rear side elevational view of the shutter in its collapsed position. Fig. 7 is a horizontal fragmentary section taken substantially in the plane of line 7—7 of Fig. 4.

Referring to Fig. 1 of the drawings, 8 designates the base section of a kitchen cabinet carrying an upper or top section 9 in spaced relation, by means of brackets 10. The usual work table 11 is mounted to slide between the two sections 8 and 9.

The top section of the cabinet comprises a compartment 12, immediately above the work table 11, which is closed by a shutter designated generally by the numeral 13. The compartment 12 has a forward frame comprising side members 14, a top member 15 and a bottom member 16, said frame defining the opening to be closed.

The shutter 13 comprises a plurality of leaves which preferably comprise a forward wall or face plate 17 (Fig. 4) formed of sheet metal and a rear wall 18 of similar material spaced from the forward wall. The two walls of the leaf are secured together in any suitable way as by means of interengaging flanges 19 and 20, and $19^a$ and $20^a$. The flanges 19 and $19^a$ are bent around the flanges 20 and $20^a$, and the parts are secured together in any suitable way as by electric welding. The rear wall 19 thus provided, constitutes a reinforcing member for the leaf rendering the same rigid and incapable of warping or flexing. To assist further in reinforcing the leaf, the face plate is corrugated as at 21 forming a panel in the central portion of the leaf. This panel contributes to the ornamental appearance of the leaf. The leaves as a whole are substantially flat, and preferably the edges of the leaves are shaped so as to coact to provide a flat face for the shutter. Thus the upper edge of each leaf is offset inwardly as at $21^a$ so as to underlie the lower edge of the upper adjacent leaf.

The leaves are hingedly connected together by means of a lazy tong linkage consisting of a pair of links 22 and 23 for each of the intermediate leaves, the opposite end leaves having relatively shorter links $22^a$ and $23^a$. (Fig. 3). The links 22 and $22^a$ are made rigid with respect to the leaves and preferably are in the form of steel bars made separately from the leaf structure and secured thereto as by means of rivets 24. For this purpose, the ends of the front wall 17 of each leaf are provided with rearwardly extending flanges 25 upon the outer sides of which the links 22 and 22ª are secured; and these rigid links are arranged at an acute angle with respect to the leaves so that when the leaves are in their upright or extended position, the links of the lazy tong are relatively inclined in the usual manner. The links are pivotally connected together to form the lazy tong hinge structure by means of pivot studs 26; and at the lower ends of the links 22 and 22ª and hence at the lower edges of the leaves, said studs are extended to provide guide studs 27 operable in straight upright guideways 29 mounted in the opposite side walls of the compartment 12.

The guideways 29 may be of any suitable construction. Herein, (Fig. 7), they are made of sheet metal in the form of a strip bent upon itself to form a central groove 30 and edge flanges 31 by means of which they are secured as by means of spot welding to the side walls of the compartment 12. These guideways are located immediately behind the side frame members, and the latter are made of substantial width so as to overlap the ends of the leaves of the shutter, which by reason of the location of the guideways and the arrangement of the guide studs 27, has its forward face disposed approximately flush with the forward face of the cabinet formed by the frame members.

The upper ends of the uppermost links 23 are pivotally supported by a rod 28 which is suitably mounted in the cabinet at the upper edge of the opening to be closed. Thus the leaves of the shutter are operable from an extended relation across the opening into a collapsed relation one upon the other in the form of a compact stack at the upper edge of the opening. When in such collapsed relation, the leaves, it will be observed, extend rearwardly (Fig. 5) into the compartment 12, the forward edges of the leaves being located in a plane rearwardly of the forward face of the cabinet formed by the frame members 14, 15, and 16, or 14ª, 15ª, and 16ª; and when the leaves are operated into their extended relation across the opening, their forward faces lie approximately flush with the forward face of the cabinet, (Fig. 7), thus forming an effective seal for the openings and at the same time presenting a neat appearance to the cabinet.

For the purpose of facilitating the operation of the shutter and for maintaining it in its open position I employ a pair of counterbalancing springs shown particularly in Fig. 5. These springs are of ordinary construction, comprising a casing 32 having pivotally mounted therein a central stationary sleeve 33 to which one end of a spring 34 is secured. The opposite end of said spring is secured to a drum 35 having wound thereon a tape 36 one end of which is secured to the drum. Its opposite end passes through an opening 37 in the casing and then downwardly for connection with the lowermost leaf of the shutter. Such connection is preferably effected by means of angular wire arms 38 mounted upon the cross rod 38ª carried by the leaf, the ends of said rod being herein extended to form the guide studs 27 for the lowermost leaf.

The counterbalancing springs are mounted in the cabinet above the opening to be closed, and may be secured in position by any suitable means such as angle irons 39. Preferably the springs are made of such strength as to support the shutter in any position across the opening. Thus, the use of separate means for supporting the shutter in its collapsed position at the upper end of the opening is unnecessary.

But thus completely counterbalancing the shutter, the operation is rendered extremely easy. The linkage operates smoothly and with substantially no noise, and exceedingly smoothly so that the shutter is extremely well adapted for the particular use to which it is herein applied. Prior shutters employed for this purpose must be slid into especially provided spaces or cavities being made flexible for this purpose and they have proven extremely objectionable because of their tendency to stick in their slideways, necessitating a tugging and pulling by the operator to effect a jerky and otherwise unsatisfactory closing or opening. Furthermore, in sheet metal cabinets the use of my shutter is rendered even more advantageous, the prior shutters being impractical on account of the increased friction of the metal, noise in operation, and the injury to the finishing enamel due to the rubbing of the parts together. It will be observed that my improved shutter effectively overcomes the difficulties thus encountered, whether used in a wooden or a metallic cabinet, because it is of a non-flexible, collapsible-leaf type.

For the convenience of the user in operating the shutter I preferably provide a handle 40 which may be secured to any one of the leaves and which is so shaped as not to interfere with the operation thereof. Herein, the said handle is secured to the second leaf from the bottom at the lower edge thereof as by spot welding, but it will be apparent that it may be secured to one of the upper leaves if desired, this being made possible by the peculiar manner in which the leaves are connected.

I claim as my invention:

1. In combination with a frame defining an opening to be closed, a plurality of leaves, means operatively connecting said leaves for movement from an extended relation across said opening with their opposite ends projecting behind said frame into a compact stack at the upper edge of the opening and projecting horizontally and rearwardly therefrom, and counterbalancing means for the leaves comprising a torsion spring mounted above the opening and having a strap extending between the frame and the forward ends of the leaves and connected with the lower end leaf.

2. A shutter comprising a plurality of leaves, means operatively connecting said leaves together to permit of their movement from extended relation to a collapsed relation and vice versa, the upper end leaf of the shutter being pivotally mounted at the upper edge of the opening to be closed, means for guiding the lower end leaf in its up and down movement, spring means operatively connected with a lower leaf and adapted to yieldingly support the leaves in various positions across the opening, said spring means comprising a casing having a stationary member therein, and a movable member, a helically coiled spring connected at its opposite ends to said members, and a flexible band secured to the outer member and adapted to be wound upon its periphery, said band being connected with said lower leaf.

3. A shutter of the character described comprising a plurality of leaves each comprising a flat metallic front plate and a reinforcing back plate, said plates being secured together at their opposite edges and the front plate having rearwardly extending flanges at its opposite ends, and means operatively connecting said leaves together for movement from an extended relation into a compact stack, said means comprising hinge devices carried by said flanges.

4. A shutter for kitchen cabinets and the like comprising, in combination, a plurality of leaves, guideways at the opposite edges of the opening to be closed, means including a lazy tong linkage operatively connecting the leaves together, and means including a plurality of guide studs carried by the leaves adapted to engage in said guideways whereby to permit of the movement of the leaves from an extended edge to edge relation into a compact stack and vice verse, said leaves each comprising a substantially flat relatively narrow plate formed of sheet metal and a second plate secured to the rear side of the first plate and adapted to reinforce the leaf whereby to prevent it from twisting and carrying said guide studs out of their normal path of movement.

In testimony whereof, I have hereunto affixed my signature.

RUDOLPH HOFFMAN.